US007536850B2

(12) United States Patent

Dooley et al.

(10) Patent No.: US 7,536,850 B2

(45) Date of Patent: May 26, 2009

(54) EMERGENCY FUEL SHUTOFF SYSTEM

(75) Inventors: Kevin Allan Dooley, Mississauga (CA); Joseph Brand, Mississauga (CA)

(73) Assignee: Pratt & Whitney Canada Corp., Longeleuk (CA)

( * ) Notice: Subject to any disclaimer, the term of this patent is extended or adjusted under 35 U.S.C. 154(b) by 560 days.

(21) Appl. No.: 11/235,141

(22) Filed: Sep. 27, 2005

(65) Prior Publication Data

US 2007/0068170 A1 Mar. 29, 2007

(51) Int. Cl.
*F02C 7/22* (2006.01)

(52) U.S. Cl. .................... 60/39.091; 60/734; 137/68.13

(58) Field of Classification Search ............. 60/39.091, 60/39.27, 39.281, 734; 137/68.13
See application file for complete search history.

(56) References Cited

U.S. PATENT DOCUMENTS 2,515,068 A * 7/1950 Young ...................... 137/68.3
2,557,448 A 6/1951 Mathisen
2,801,517 A * 8/1957 Zucrow et al. ........... 137/68.13
3,013,571 A 12/1961 Fulton
3,713,458 A * 1/1973 Lee ........................ 137/68.13
4,712,372 A 12/1987 Dickey et al.
5,086,617 A 2/1992 Smith
6,607,349 B2 8/2003 Mulera et al.
6,881,024 B2 4/2005 Binetruy et al.
2005/0047913 A1 3/2005 Rensch
2005/0109038 A1 5/2005 Matthews
2005/0193715 A1 9/2005 Opper

FOREIGN PATENT DOCUMENTS

WO WO 99/00585 1/1999
WO WO 99/32772 7/1999
WO WO 02/31332 A1 4/2002

OTHER PUBLICATIONS

PCT International Search Report for International application No. PCT/CA2006/000748 mailed Aug. 28, 2006.

* cited by examiner

*Primary Examiner*—Louis J Casaregola
(74) *Attorney, Agent, or Firm*—Ogilvy Renault LLP; Todd D. Bailey

(57) ABSTRACT

The emergency fuel shutoff system for a gas turbine engine comprises a pyrotechnic device which allows the fuel circuit to be closed upon triggering of the pyrotechnic device.

16 Claims, 2 Drawing Sheets

60 20 58a 50a U1 U2 30 34 62a R1 100 U7 26 32 U8 54a 42a 52a 36 U9 0V +28V 50b U3 56a 40 U4 58b 62b R2 100 U5 42b 54b U6 52b 22 U10 24 28 0V +28V 56b FUEL 10
18
16
14
12

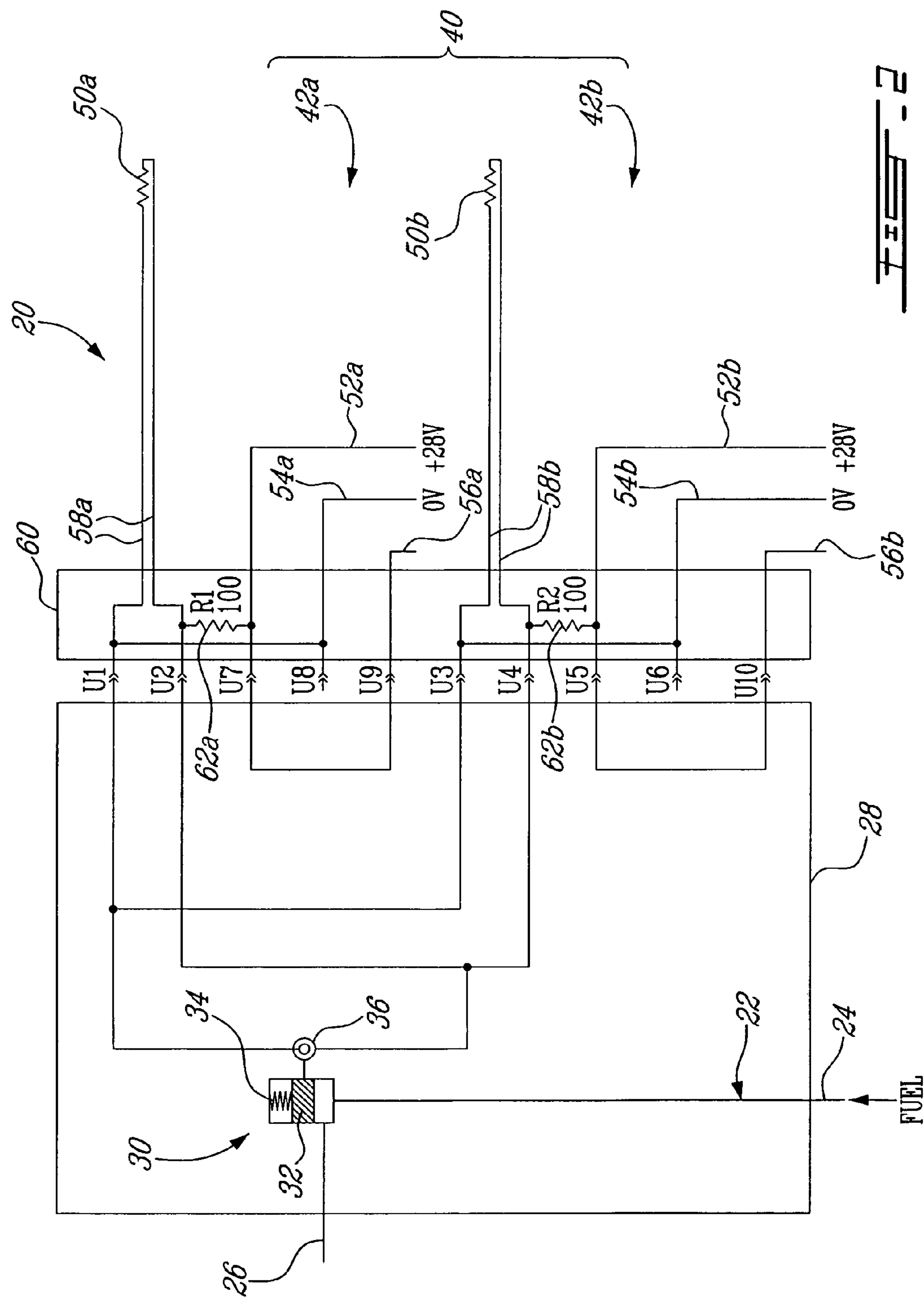
20
40
42a
42b
50a
50b
52a
52b
54a
54b
56a
56b
58a
58b
60
0V +28V
0V +28V
R1 100
R2 100
U1
U2
U7
U8
U9
U3
U4
U5
U6
U10
62a
62b
28
34
36
22
24
FUEL
30
32
26

EMERGENCY FUEL SHUTOFF SYSTEM

TECHNICAL FIELD

The invention relates generally to the closing of a fuel supply in case of an emergency and, more particularly, to an emergency fuel shutoff system and method.

BACKGROUND OF THE ART

A fuel shutoff system is required on some engines or similar devices in order to close the fuel supply without or prior to the shutdown of the fuel pump system. In these engines, such as in gas turbine engines, a fuel shutoff system is provided to quickly close the fuel supply in case of an emergency. For instance, in a multi-spool gas turbine engine, the fuel supply must be interrupted extremely quickly in the event of a low pressure shaft shear. Because of the fast response time of gas turbine engines, a low pressure shaft shear may cause an increased fuel flow that is likely to increase the problem. Perhaps more critically, however, is that the turbine has virtually no load after shaft shear, and will thus quickly overspeed and fail catastrophically. These conditions require that the fuel supply be interrupted with the smallest possible delay.

Conventional fuel shutoff systems for gas turbine engines use cable and pulley mechanisms or solenoid systems. A probe or a similar arrangement is provided very close to the shaft and is used to detect the low pressure shaft shear. If this happens, the fuel supply is shutoff using a mechanical movement through the use of the cables and pulleys, or using an electrical signal. Although these mechanisms and systems have a relatively small response time, there is still a need for a faster arrangement.

Accordingly, there is a need to provide an improved emergency fuel shutoff system and method that can have a response time faster than existing mechanisms and systems.

SUMMARY OF THE INVENTION

In one aspect, the present invention provides an emergency fuel shutoff system for a gas turbine engine, the gas turbine engine having at least a fuel circuit, the fuel shutoff system comprising: an explosive member; a triggering circuit connected to the explosive member; and a fuel circuit interrupting device mounted on the fuel circuit, the interrupting device being activated by explosion of the explosive member.

In another aspect, the present invention provides an emergency fuel shutoff system to be mounted on a fuel circuit a gas turbine engine, the system comprising: a pyrotechnic device; means for triggering the pyrotechnic device; and means for closing the fuel circuit operational as a result of activation of the pyrotechnic device.

In another aspect, the present invention provides A method of shutting off a fuel circuit of a gas turbine engine, the method comprising: providing a fuel circuit closing device in the fuel circuit, the device having a 'standby' position wherein fuel may pass therethrough and a 'interrupt' position wherein the fuel flow therethrough is substantially impeded, the fuel circuit closing device being biased to the 'interrupt' position; holding a fuel circuit closing device in the 'standby' position using an explosive member; and triggering the explosive member to substantially remove the member from the fuel circuit closing device, thereby permitting the closing device to move to the 'interrupt' position.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 2 is a schematic view of a fuel shutoff system in accordance with a possible embodiment.

DETAILED DESCRIPTION OF THE PREFERRED EMBODIMENTS

Figure 1:
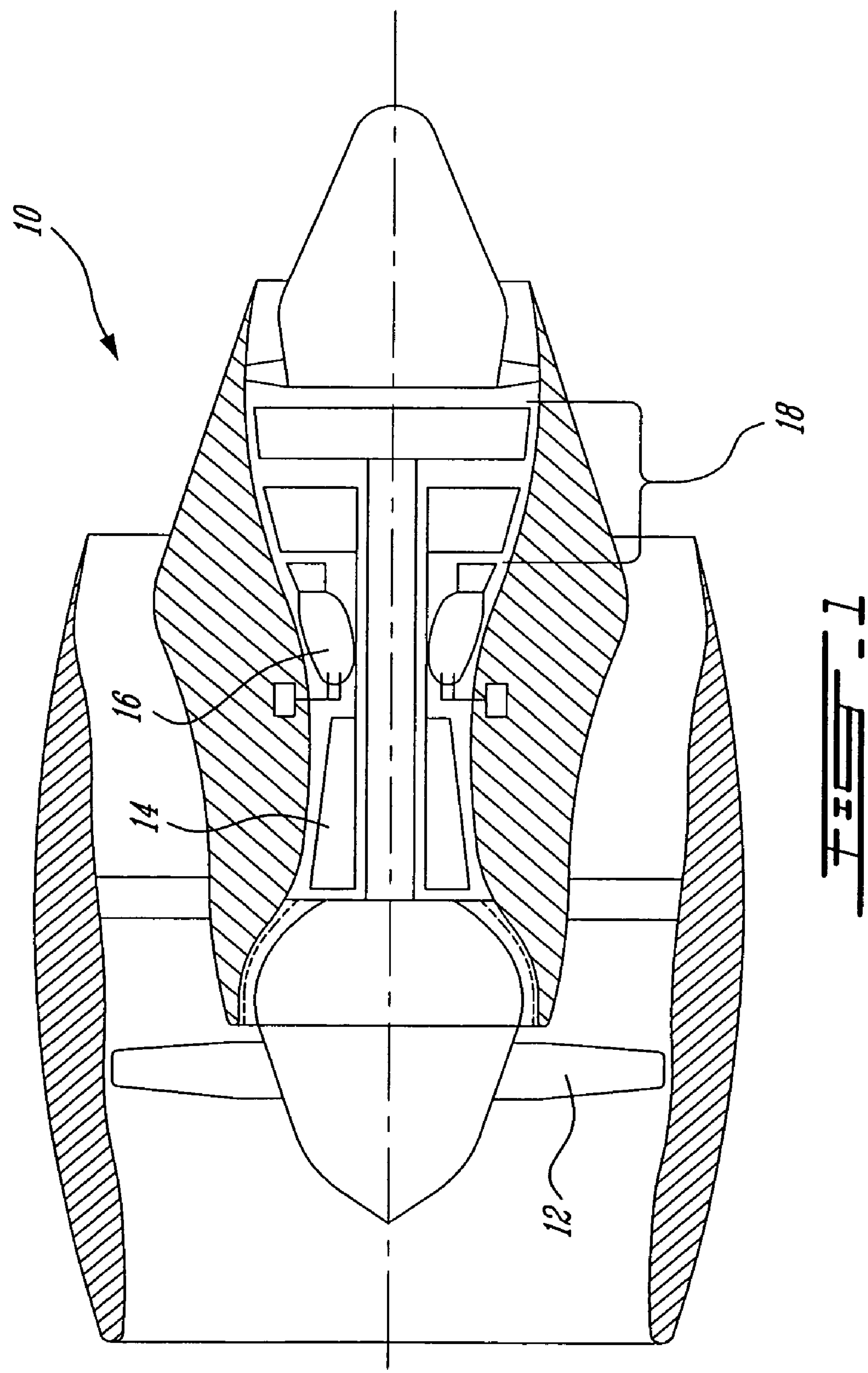
FIG. 1 is a schematic view of a gas turbine engine showing an example of a possible environment in which the emergency fuel shutoff system and the method can be used.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases. This figure illustrates an example of an environment in which the fuel shutoff system can be used.

FIG. 2 schematically illustrates an example of an emergency fuel shutoff system 20 in accordance with the present invention. This system 20 comprises a fuel circuit 22 having a fuel inlet 24 and a fuel outlet 26. The emergency fuel shutoff system 20 can be located in a separate housing 28 or be integrated with another system. In this embodiment, the system 20 comprises a fuel circuit closing device 30 including a moveable piston 32 with a spring 34 having a very high preload. The piston 32 is maintained in a standby position using an explosive bolt or member 36. One of the advantages of explosive bolts is that they are readily available on the market and can be purchased through many suppliers, or may be designed specifically for the intended application. The specific design and construction of such devices does not form part of the present invention.

Another advantage of using explosive bolts is that they have an extremely small response time. Also, when the closing device 30 is designed with a small stroke and with a spring 34 having a very high preload, the response time of the piston 32 will be small as well.

In case of an emergency, the explosive bolt 36 is triggered to release the piston 32, thereby allowing it to move to the position where the fuel circuit 22 is closed. The explosive bolt 36 is selected to be completely contained upon firing, and thus minimize any effect to adjacent engine systems. The system 20 is said to be an emergency system since once exploded, the explosive bolt 36 must be replaced by a new one before the fuel circuit 22 be used once again.

A triggering circuit 40 is used for triggering the explosive bolt 36. FIG. 2 illustrates an example of a triggering circuit 40 which has been designed for a gas turbine engine. It comprises a main side 42*a* and a redundant side 42*b*, each having its own engine failure detector. An example of a detector is a wear probe, such as one provided with a ceramic rod containing a conducting foil. The wear probes 50*a*, 50*b*, shown in FIG. 2, are configured and disposed to be worn off due to a shaft shear. The wear probes 50*a*, 50*b* are located very close to the rear end of the shaft. A shaft shear will rub the probes 50*a*, 50*b*. When both sides 42*a*, 42*b* of the triggering circuit 40 are powered, both wear probes 50*a*, 50*b* must be worn off before the explosive bolt 36 is fired.

Each side 42*a*, 42*b* of the triggering circuit 40 comprises a corresponding power terminal 52*a*, 52*b*, a corresponding neutral or ground terminal 54*a*, 54*b* and an optional feedback terminal 56*a*, 56*b*. Each wear probe 50*a*, 50*b* is connected to the circuit 40 using a corresponding pair of terminals 58*a*, 58*b*. The optional feedback terminal 56*a*, 56*b* on each side 42*a*, 42*b* is used to confirm that they are powered. When no potential is detected upon starting the engine, the electronic engine control will note that there is a fault.

In the illustrated embodiment, the various terminals are attached to the fuel shutoff housing 28 using a two-part connector 60. This facilitates the maintenance or the replacement of the closing device 20. Each side of the triggering circuit 40 comprises a resistor 62*a*, 62*b* to keep a small current into the system. The resistors 62*a*, 62*b* are preferably located on the removable part of the connector 60 so that no accidental firing can occur when connecting or disconnecting the connector 60, should the power be on at that moment.

The explosive bolt 36 is triggered when the potential at the terminals of its detonator is sufficiently high. When both sides 42*a*, 42*b* are powered, and only one of the wear probes 50*a*, 50*b* is broken, the potential at the terminals of the explosive bolt 36 remains the same. However, when both probes 50*a*, 50*b* are worn off, the potential at the terminals of the explosive bolt 36 will be significantly higher, thereby triggering the explosive bolt 36.

If required, one side of the triggering circuit 40 can be deactivated so that the explosive bolt 36 be triggered using only the opposite wear probe 50*a*, 50*b*.

The above description is meant to be exemplary only, and one skilled in the art will recognize that changes may be made to the embodiments described without departing from the scope of the invention disclosed. For example, although described as an explosive or pyrotechnic "bolt", the device need not be a bolt, per se, as the skilled reader will understand. Also, the triggering circuit can have only one side or have more than two sides. The triggering circuit can be different from what is shown in the figures. The present invention is not limited to gas turbine engines and can be used on any other engines or machines. The fuel circuit closing device can differ from what is shown and described, such as being a rotary unit or be biased by a pressurized gas or the like. The system can include an additional firing activation which would allow the electronic engine control or even an operator, through the manual activation of a switch, to shutoff the fuel supply using the system. Still other modifications which fall within the scope of the present invention will be apparent to those skilled in the art, in light of a review of this disclosure, and such modifications are intended to fall within the appended claims.

What is claimed is:

1. An emergency fuel shutoff system for a gas turbine engine, the gas turbine engine having at least a fuel circuit, the fuel shutoff system comprising:

an explosive member;

a triggering circuit connected to the explosive member, the triggering circuit including an engine failure detector; and a fuel circuit interrupting device mounted on the fuel circuit, the interrupting device being activated by explosion of the explosive member.

2. The fuel shutoff system as defined in claim 1, wherein the engine failure detector includes a wear probe.

3. The fuel shutoff system as defined in claim 2, wherein the wear probe is provided in a ceramic rod.

4. The fuel shutoff system as defined in claim 1, wherein the engine failure detector includes at least one redundant wear probe, the triggering circuit being configured to trigger the explosive member when all wear probes are worn off due to a shaft shear.

5. The fuel shutoff system as defined in claim 4, wherein the wear probes are mounted next to a shaft supporting a low pressure rotor of a multispool gas turbine engine.

6. The fuel shutoff system as defined in claim 1, wherein the explosive member and the engine failure detector are at least partially connected together through a removable connector, the removable connector including means for preventing the explosive member from being accidentally triggered upon connecting or disconnecting the removable connector when the engine failure detector is powered.

7. The fuel shutoff system as defined in claim 6, wherein the removable connector comprises at least one feedback terminal for sending a signal confirming that the engine failure detector is powered.

8. The fuel shutoff system as defined in claim 1, wherein the fuel circuit interrupting device comprises a spring-loaded valve.

9. An emergency fuel shutoff system to be mounted on a fuel circuit a gas turbine engine, the system comprising:

a pyrotechnic device;

means for triggering the pyrotechnic device, the means for triggering including an engine failure detector; and means for closing the fuel circuit operational as a result of activation of the pyrotechnic device.

10. The fuel shutoff system as defined in claim 9, wherein the engine failure detector includes a wear probe.

11. The fuel shutoff system as defined in claim 10, wherein the wear probe is provided in a ceramic rod.

12. The fuel shutoff system as defined in claim 10, wherein the engine failure detector includes at least one redundant wear probe, the triggering circuit being configured to trigger the pyrotechnic device when all wear probes are worn off due to a shaft shear.

13. The fuel shutoff system as defined in claim 12, wherein the wear probes are mounted next to a shaft supporting a low pressure rotor of a multispool gas turbine engine.

14. The fuel shutoff system as defined in claim 9, wherein the pyrotechnic device and the engine failure detector are at least partially connected together through a removable connector, the removable connector including means for preventing the pyrotechnic device from being accidentally triggered upon connecting or disconnecting the removable connector when the engine failure detector is powered.

15. The fuel shutoff system as defined in claim 14, wherein the removable connector comprises at least one feedback terminal for sending a signal confirming that the engine failure detector is powered.

16. The fuel shutoff system as defined in claim 9, wherein the means for closing the fuel circuit comprise a spring-loaded valve.

* * * * *